US012424895B2

(12) United States Patent
Huang et al.

(10) Patent No.: US 12,424,895 B2
(45) Date of Patent: Sep. 23, 2025

(54) FAN STRUCTURE

(71) Applicant: ASIA VITAL COMPONENTS CO., LTD., New Taipei (TW)

(72) Inventors: Jing-Ping Huang, New Taipei (TW); Feng Liu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 338 days.

(21) Appl. No.: 18/058,739

(22) Filed: Nov. 24, 2022

(65) Prior Publication Data

US 2023/0353004 A1  Nov. 2, 2023

(51) Int. Cl.
*H02K 5/08* (2006.01)
*B29C 70/84* (2006.01)
*B29L 31/00* (2006.01)
*H02K 15/14* (2025.01)

(52) U.S. Cl.
CPC ............. *H02K 5/08* (2013.01); *H02K 15/14* (2013.01); *B29C 70/84* (2013.01); *B29K 2995/0093* (2013.01); *B29L 2031/748* (2013.01)

(58) Field of Classification Search
CPC .. H02K 5/08; H02K 15/14; B29K 2995/0093; B29L 2031/748
See application file for complete search history.

(56) References Cited

U.S. PATENT DOCUMENTS

| | | | | |
|---|---|---|---|---|
| 8,760,018 B2* | 6/2014 | Liu | ........................ | H02K 11/33 310/43 |
| 2005/0265834 A1* | 12/2005 | Wang | .................... | F04D 25/062 415/220 |
| 2007/0126296 A1* | 6/2007 | Lee | .......................... | H02K 5/10 310/43 |

(Continued)

FOREIGN PATENT DOCUMENTS

| CN | 101257231 A | 9/2008 |
|---|---|---|
| CN | 113258735 A | 8/2021 |

(Continued)

OTHER PUBLICATIONS

Search Report dated Oct. 25, 2022 issued by Taiwan Intellectual Property Office for counterpart application No. 111116039.

(Continued)

*Primary Examiner* — Forrest M Phillips
(74) *Attorney, Agent, or Firm* — Bradley J. Thorson; DeWitt LLP

(57) ABSTRACT

A fan structure includes a fan frame having a base and a shaft barren vertically upward extended from the base; a motor stator enclosure having a top provided with a shaft hole and an open bottom correspondingly covering and connecting to a top of the base, such that the motor stator enclosure, the shaft barrel and the base together define a potting space among them; a potting opening selectively provided on the base or the motor stator enclosure to communicate with the potting space; a motor stator externally fitted around the shaft barrel and located in the potting space; and a potting (Continued)

compound filled in the potting space to cover the motor stator. With the above arrangements, the fan structure overcomes the problem in conventional inconvenient fan potting process to largely reduce production costs, production time, bad yield rate, and reworking.

5 Claims, 9 Drawing Sheets

(56) References Cited

U.S. PATENT DOCUMENTS

| | | | |
|---|---|---|---|
| 2014/0175923 A1* | 6/2014 | Chen | H02K 5/161 |
| | | | 310/88 |
| 2020/0052539 A1* | 2/2020 | Hsu | H02K 15/14 |
| 2024/0113587 A1* | 4/2024 | Shiraishi | H02K 5/10 |

FOREIGN PATENT DOCUMENTS

| | | |
|---|---|---|
| CN | 217233854 U | 8/2022 |
| TW | 200835120 A | 8/2008 |

OTHER PUBLICATIONS

Search Report dated Dec. 3, 2024 issued by China National Intellectual Property Administration for counterpart application No. 2022104570545.

* cited by examiner

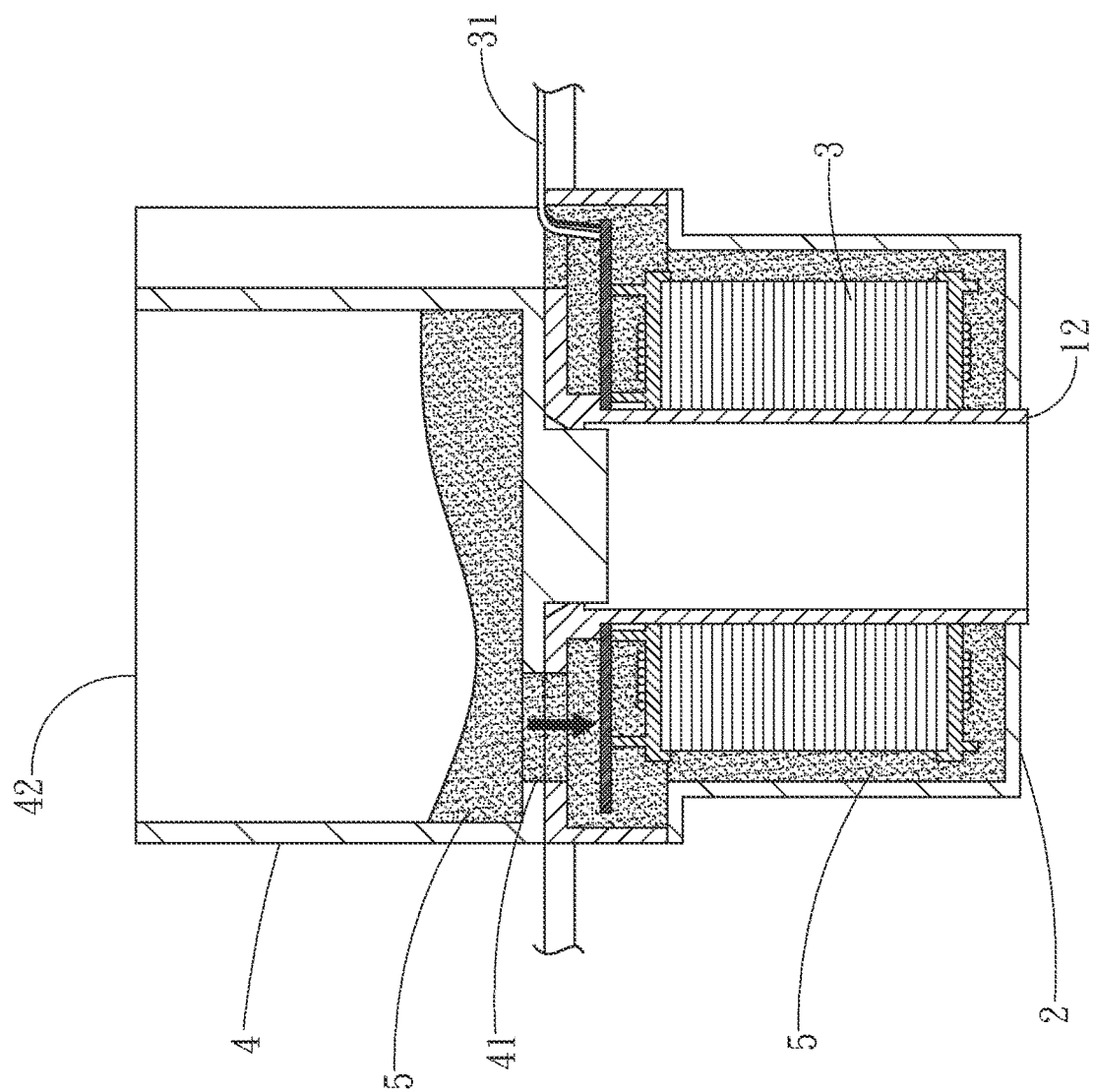

FAN STRUCTURE

This application claims the priority benefit of Taiwan patent application number 111116039 filed on Apr. 27, 2022.

FIELD OF THE INVENTION

The present invention relates to the field of fan production, and more particularly, to a fan stator waterproof structure.

BACKGROUND OF THE INVENTION

A stator of a fan motor can be fully covered by a potting compound via a stator potting process. The potting compound in a cured state provides the motor stator with good protection against moisture to thereby largely increase the reliability of fan and enable the fan to be used in some very severe environments.

Please refer to FIGS. 1A and 1B. A conventional fan motor stator potting process includes the following steps: placing a motor stator in a metal mould assembly 9 formed of multiple pieces of moulds, such as a first, a second and a third metal mould 91, 92, 93, which are assembled together using fastening means, such as bolts; filling a liquid potting compound into the metal mould assembly 9 and heating the latter to harden the potting compound; disassembling the metal mould assembly 9 when the potting compound is cured and removing the potted motor stator 81 from the mould pieces; and finally, mounting the potted motor stator to a shaft barrel 82 on a frame of the fan. The above described conventional stator potting process has a plurality of problems, which are described below.
1. High production cost: In the conventional stator potting process, specially designed and manufactured potting moulds are required. Since each mould assembly can be used to pot only one motor stator, a large number of mould assemblies corresponding to the number of motor stators to be potted must be prepared in the case of massive production.
2. Low production efficiency: Each time of potting one motor stator, the mould assembly must be assembled once and disassembled once. To avoid leaking of potting compound from the mould assembly, the mould pieces must be exactly tightened together using bolts. The heated and cured potting compound increases difficulties in disassembling the mould assembly and might adhere to the mould pieces. Meanwhile, it is time consuming to loosen and remove the bolts.
3. Relatively high bad yield rate: Loss and wearing of the mould pieces would gradually increase after they are used over a long time, which has adverse influences on the potting process, such as forming cracks in the potting compound, forming air bubbles on the surface of potting compound to result in incomplete covering of the motor stator by the potting compound, and forming burrs on the potted motor stator. All the problems require reworking after the potting process, and in some worse condition, there is no way to repair the defective products but to discard them.
4. Requiring additional processing steps: The motor stator after potting process has to be manually mounted to the shaft barrel on the fan frame, which requires additional time and labors.

Therefore, it is tried by the inventor to develop an improved fan structure in an attempt of solving the problems in the conventional motor stator potting process.

SUMMARY OF THE INVENTION

A primary object of the present invention is to thoroughly overcome the problems in the conventional motor stator potting process by providing a fan structure, which uses a motor stator enclosure to replace the mould assembly used in the convention potting process.

To achieve the above and other objects, the fan structure according to the present invention includes a fan frame having a base and a shaft barrel vertically upward extended from the base; a motor stator enclosure having a top provided with a shaft hole and an open bottom correspondingly covering and connecting to a top of the base, such that the motor stator enclosure, the shaft barrel and the base together define a potting space among them; a potting opening selectively provided on the base or the motor stator enclosure to communicate with the potting space; a motor stator externally fitted around the shaft barrel and located in the potting space; and a potting compound filled in the potting space to cover the entire motor stator.

With the above arrangements, the fan structure of the present invention thoroughly overcomes the problems in the conventional potting process using metal mould assembly and thereby largely increases fan production efficiency and good yield rate. Meanwhile, since there is no need to use specially designed potting mould assembly, the overall production costs is reduced to eliminate the problems in conventional potting process. Further, the motor stator enclosure provides an outermost protection to the overall fan structure, giving the fan structure an even better structural strength.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 3A to 3C illustrate the fan potting process for the fan structure of the present invention.

DETAILED DESCRIPTION OF THE PREFERRED EMBODIMENTS

Figure 1A:
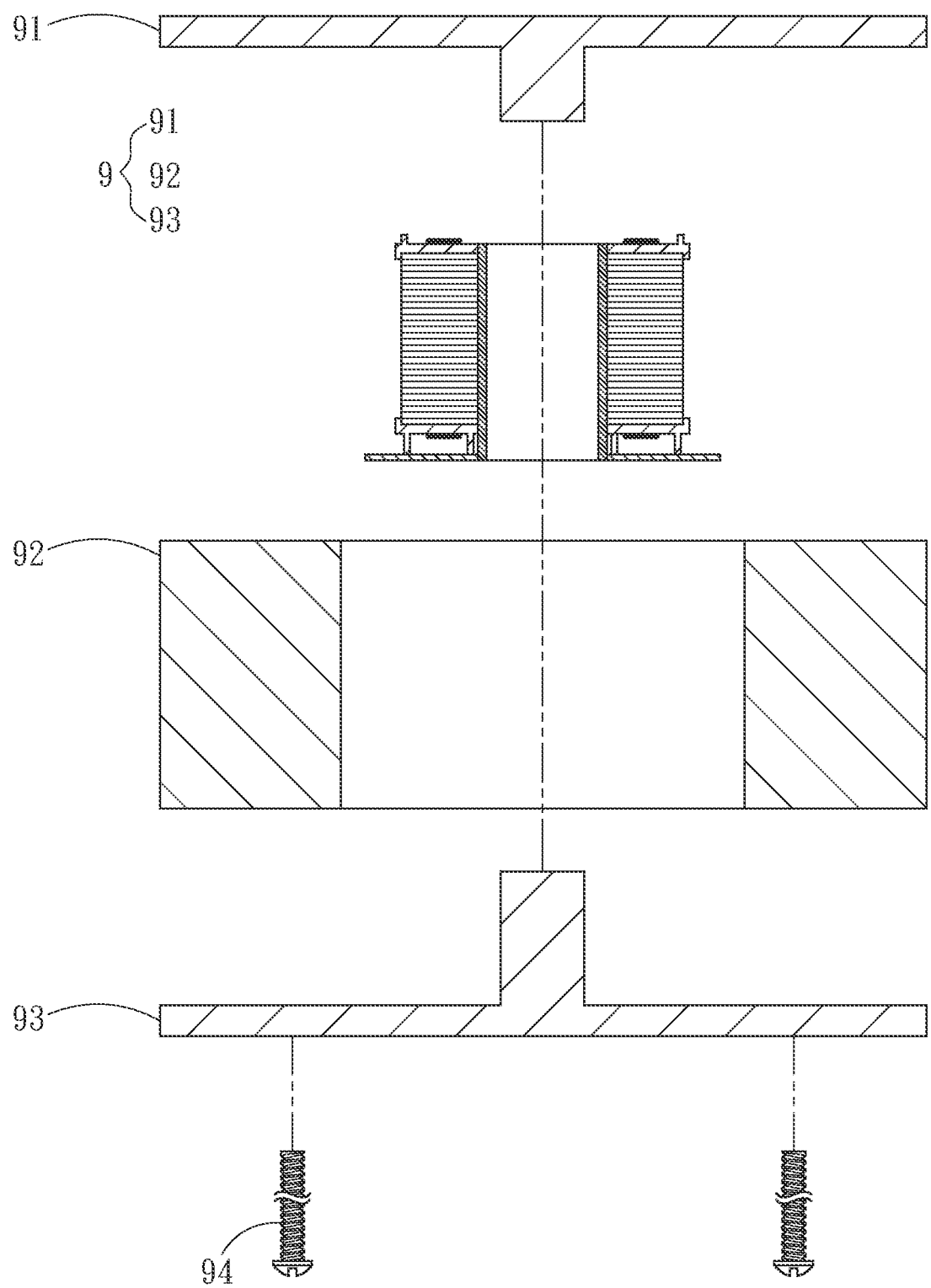
FIG. 1A is an exploded sectional view showing the conventional fan motor stator potting process.
Figure 1B:
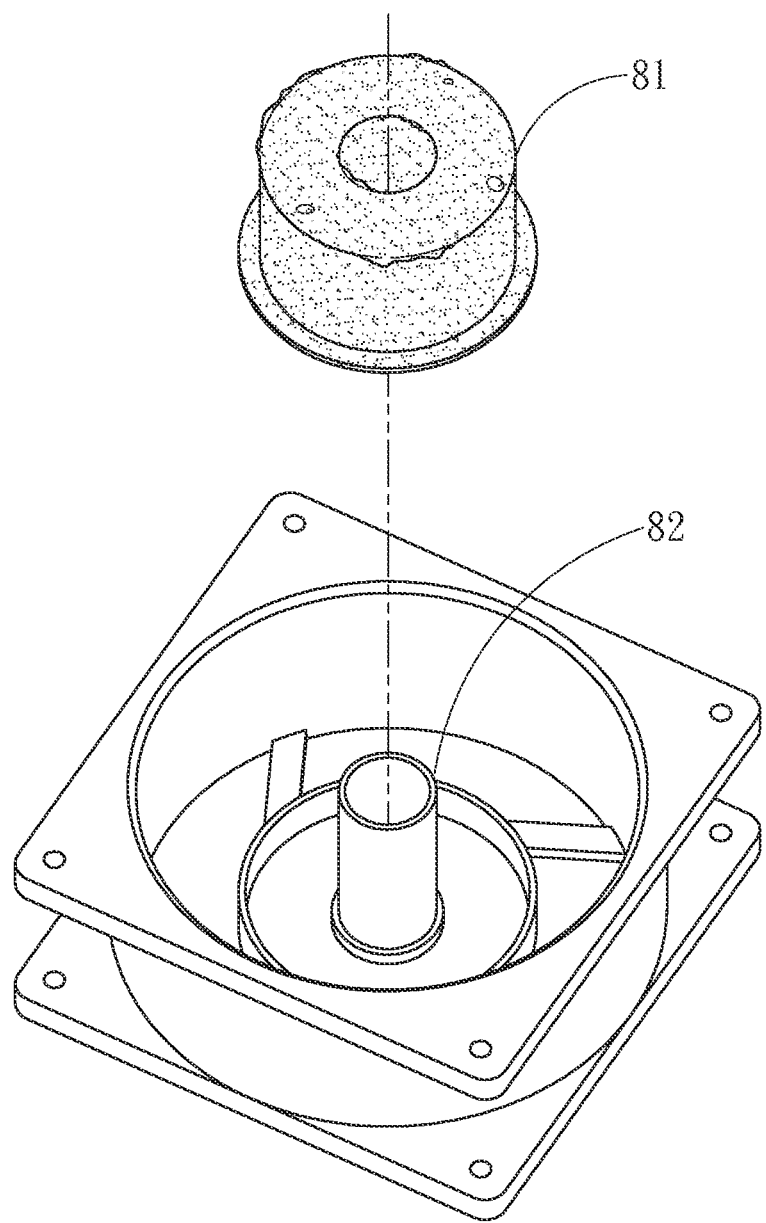
FIG. 1B shows a potted fan stator completed in the conventional fan motor stator potting process of FIG. 1A is mounted to a fan frame.

The present invention will now be described with some preferred embodiments thereof. For the purpose of easy to understand, elements that are the same in the preferred embodiments are denoted by the same reference numerals.

Figure 2A:
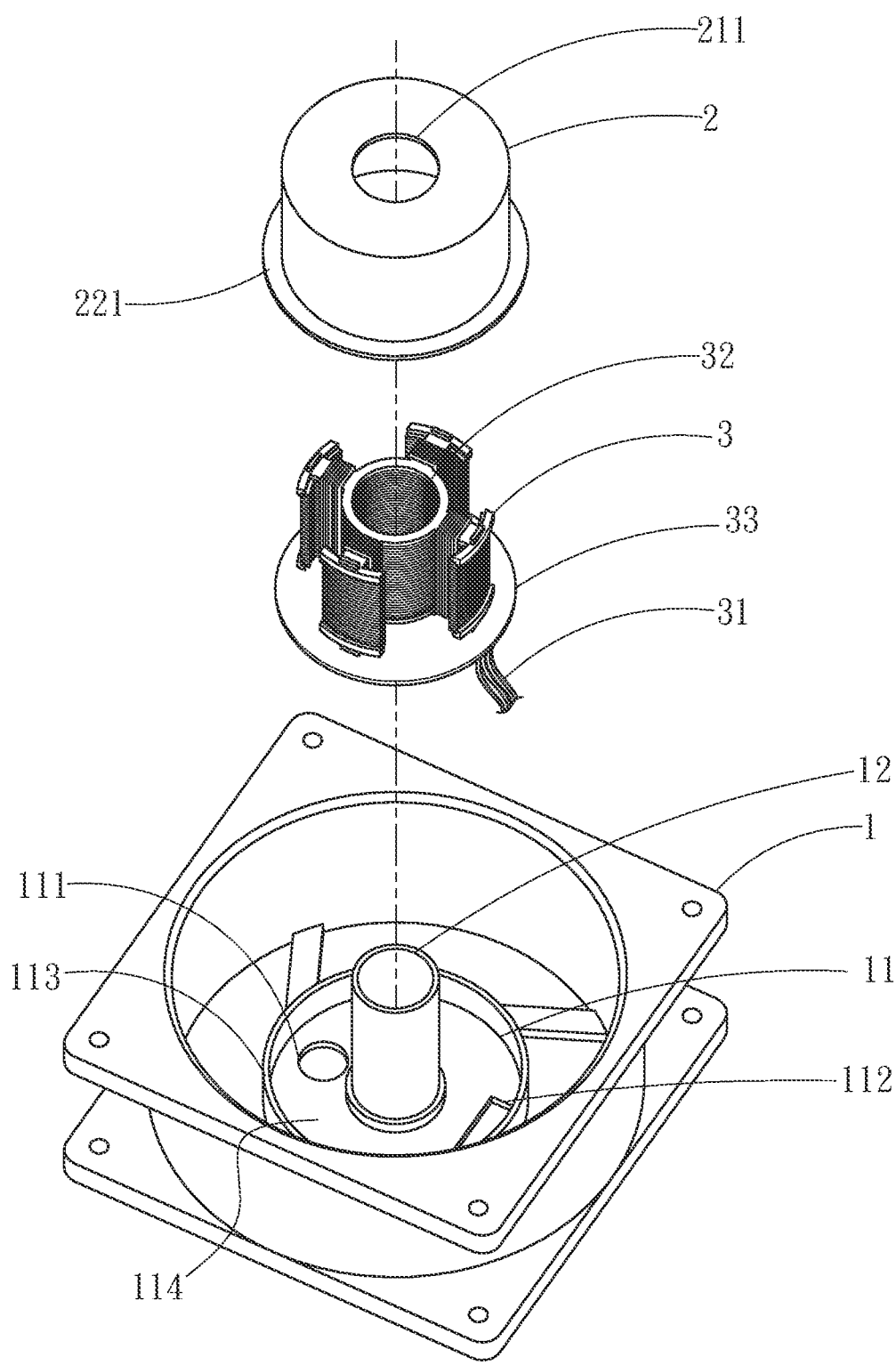
FIG. 2A is an exploded perspective view showing parts of a fan structure of the present invention before a fan potting process.
Figure 2B:
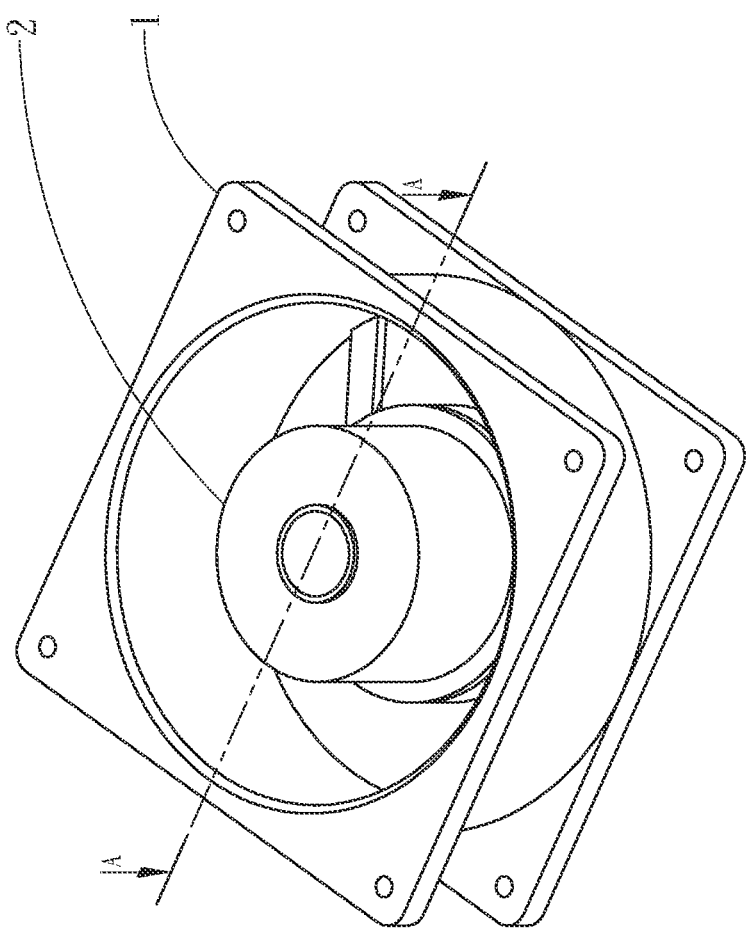
FIG. 2B is an assembled view of FIG. 2A.
Figure 2C:
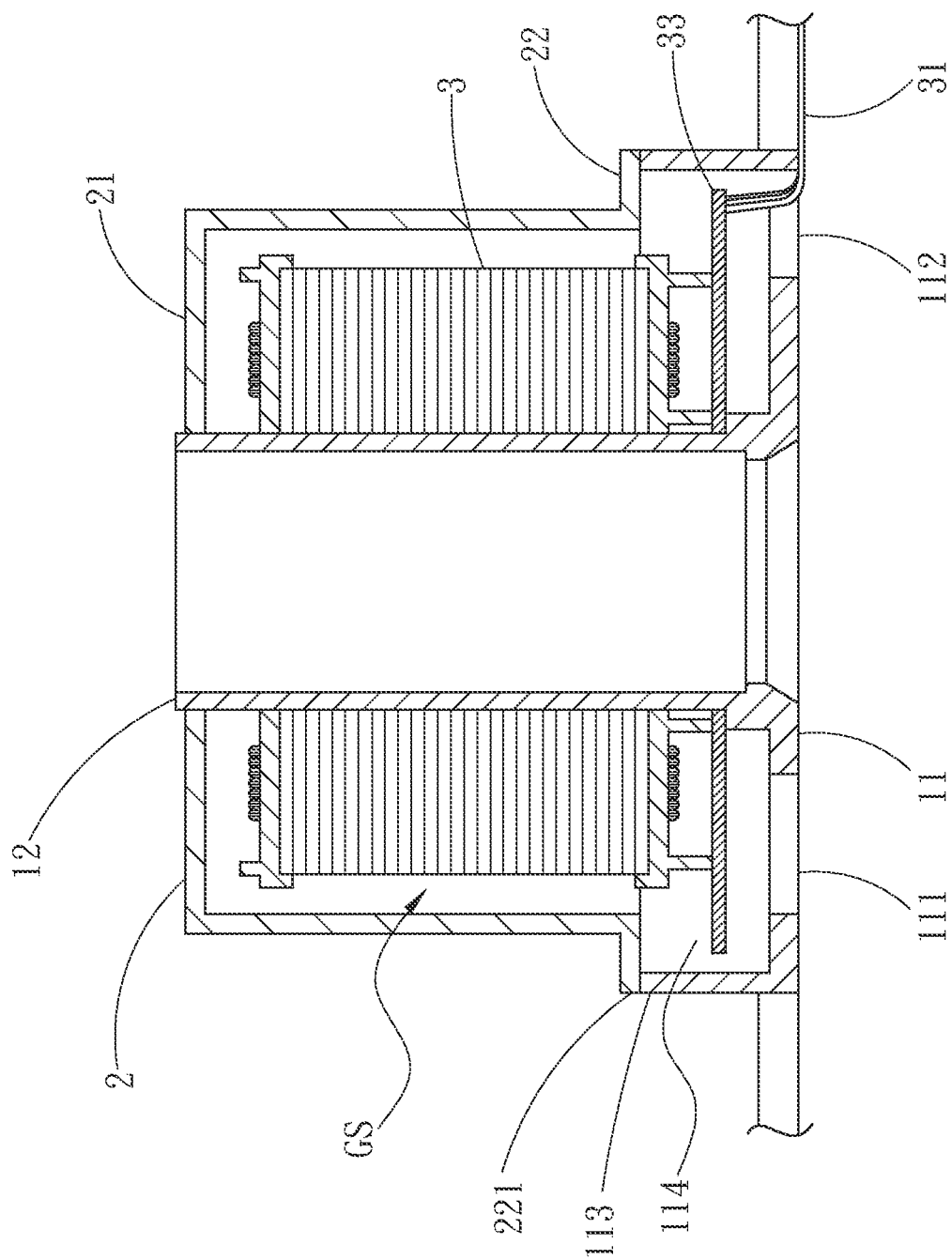
FIG. 2C is a sectional view of FIG. 2B showing a potting opening formed on a base of the fan structure.
Figure 2D:
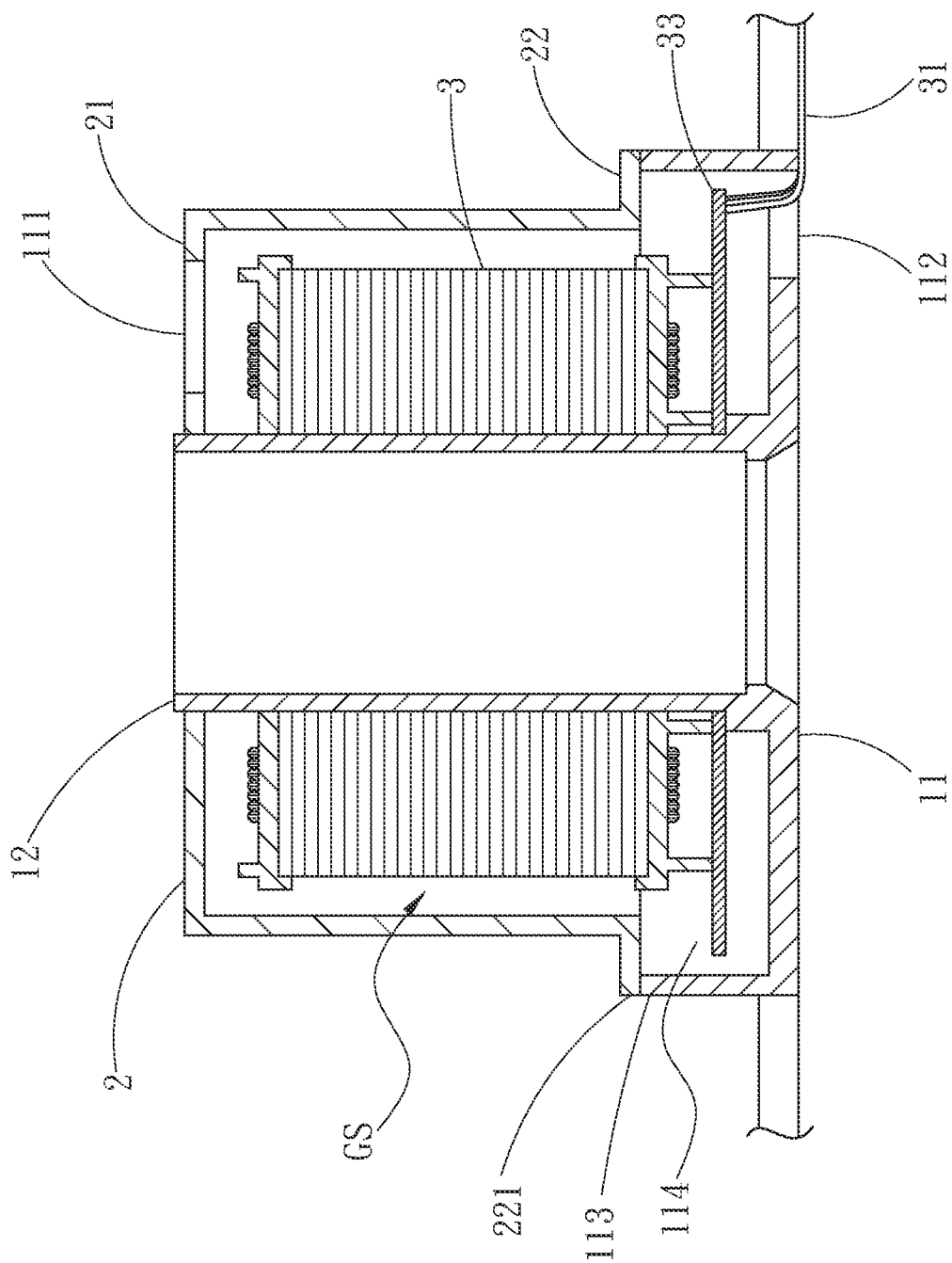
FIG. 2D is a sectional view of FIG. 2B showing a potting opening formed on a motor stator enclosure.

Please refer to FIGS. 2A to 2D, wherein FIG. 2A is an exploded perspective view showing parts of a fan structure of the present invention before a fan potting process; FIG. 2B is an assembled view of FIG. 2A; FIG. 2C is a sectional view of FIG. 2B according to a preferred embodiment of the present invention; and FIG. 2D is a sectional view similar to FIG. 2C according to another embodiment of the present invention. As shown, a fan structure according to a preferred embodiment of the present invention includes a fan frame 1, a motor stator enclosure 2, a motor stator 3, and a potting compound 5.

The fan frame 1 includes a base 11 and a shaft barrel 12 vertically upward extended from the base 11. The base 11 is provided with a potting opening 111, a wiring opening 112, and an annular wall 113. A recess 114 is defined between the annular wall 113 and the shaft barrel 112.

The motor stator enclosure 2 includes a top 21 and a bottom 22. The top 21 is provided with a shaft hole 211, which has an inner diameter corresponding to an outer diameter of the shaft barrel 12 for the shaft barrel 12 to extend through the shaft hole 211. The bottom 22 includes a radially outward extended flange 221.

The motor stator 3 includes a plurality of conducting wires 31, an iron core central bore 32, and a base board 33. The conducting wires 31 are extended through the wiring opening 112, and the iron core central bore 32 has an inner diameter corresponding to the outer diameter of the shaft barrel 12.

The bottom 22 is an open side of the motor stator enclosure 2 being sized for correspondingly covering a top of the recess 114 and connecting to the base 11 with the flange 221 pressed against and connected to the annular wall 113. The shaft barrel 12 sequentially extends through the motor stator 3 and the motor stator enclosure 2 to form a tight fit between it and the shaft hole 211 and the iron core central bore 32, so that the motor stator enclosure 2 mounted to the base 11 won't shake relative to the shaft barrel 12 or produce any gap between it and the shaft barrel 12. The base board 33 is located in the recess 114; and the shaft hole 211 is closed by the shaft barrel 12 when the shaft barrel 12 is extended through the shaft hole 211. Thus, a sealed potting space GS is defined among the motor stator enclosure 2, the shaft barrel 12 and the recess 114.

The potting compound 5 is filled in the potting space GS to cover an outer side of the motor stator 3.

In the illustrated preferred embodiment, the potting opening 111 is provided on the base 11, as shown in FIG. 2C. In another embodiment, the potting opening 111 is provided on the top 21 of the motor stator enclosure 2, as shown in FIG. 2D.

Figure 3A:
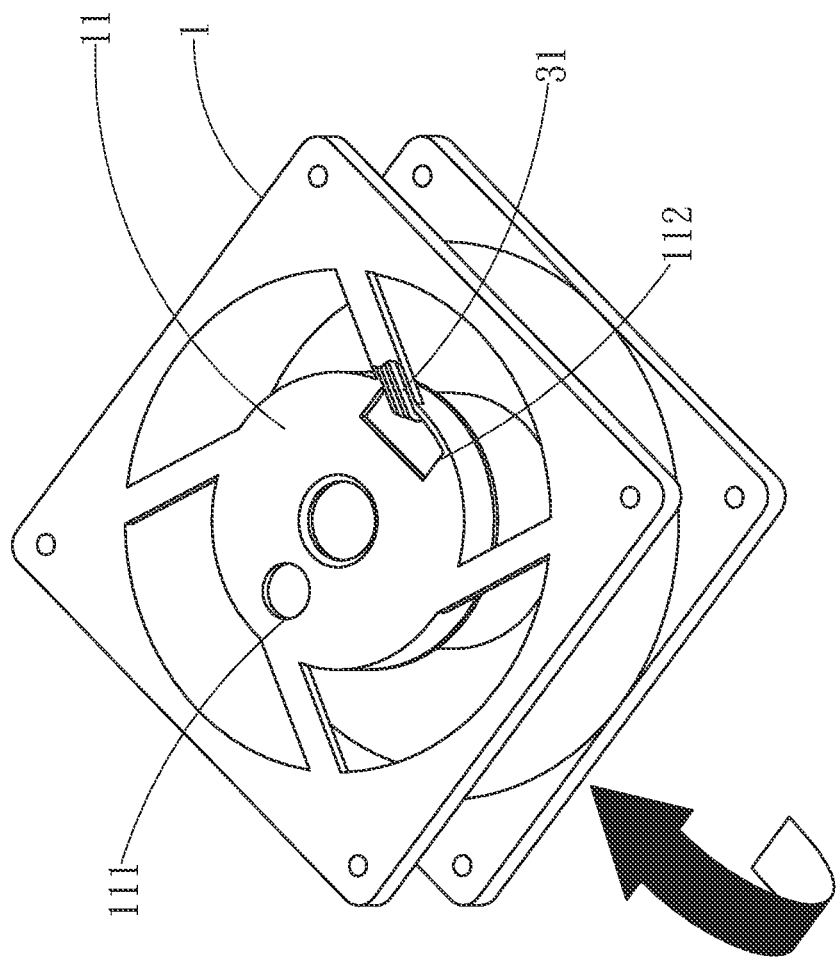
Figure 3B:
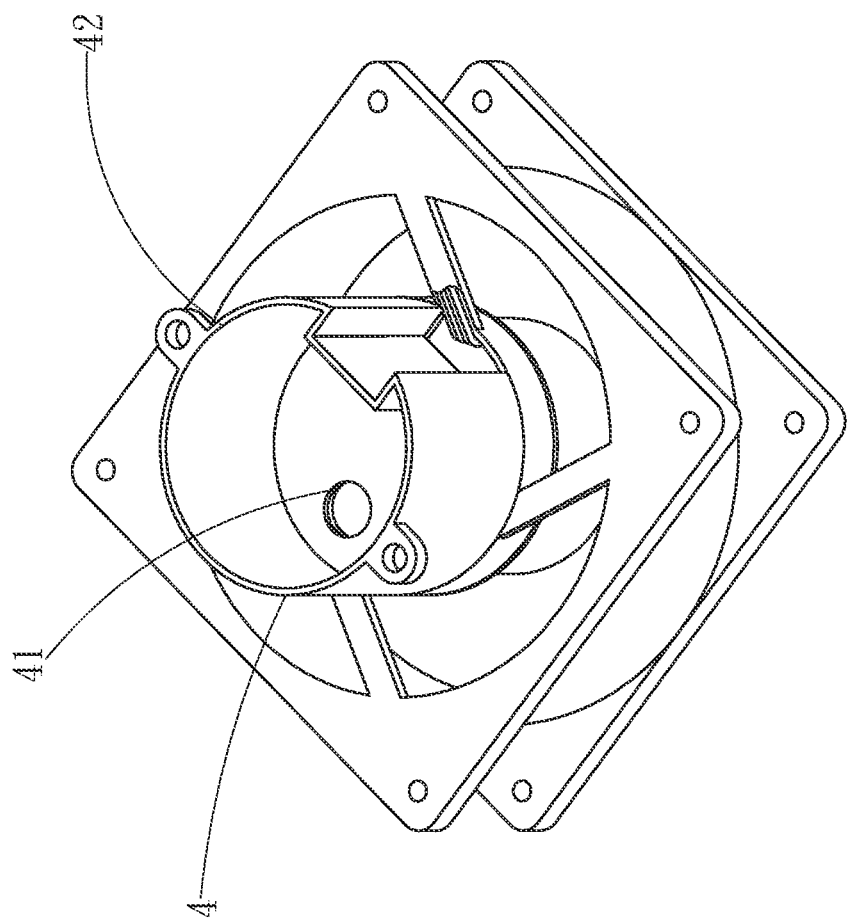

FIGS. 3A to 3C illustrate a fan potting process for the fan structure of the present invention. Please refer to FIGS. 3A to 3C along with FIGS. 2A to 2D. The fan potting process is described in detail below.

(1) Providing a fan frame, a motor stator enclosure, and a motor stator; the fan frame includes a base and a shaft barrel vertically upward extended from the base; the motor stator is externally fitted around the shaft barrel; and the base or the motor stator enclosure is provided with at least one potting opening. More specifically, in the first step of the fan potting process, the fan frame 1, the motor stator enclosure 2 and the motor stator 3 according to the present invention are provided; the motor stator 3 is fitted around an outer side of the shaft barrel 12 of the fan frame 1; and, in a preferred embodiment of the present invention, the base 11 of the fan frame 1 is provided with a potting opening 111.

(2) Covering the motor stator enclosure on the motor stator and connecting the motor stator enclosure and the motor stator to the base, so that a potting space is defined among the motor stator enclosure, the motor stator and the base. More specifically, the motor stator enclosure 2 is connected to the fan frame 1 with the shaft barrel 12 extended through and closing the shaft hole 211 simultaneously, so that the motor stator enclosure 2, the shaft barrel 12, and the recess 114 on the base 11 of the fan frame 1 together define a sealed potting space GS among them.

(3) Aligning an end of a potting funnel with the potting opening and filling a liquid potting compound into the potting space. More specifically, a potting funnel 4 is provided. The potting funnel 4 is provided at two opposite ends with a first opening 41 and a second opening 42 that are communicable with each other. The second opening 42 has a diametrical size larger than that of the first opening 41; and the first opening 41 is correspondingly connected to the potting opening 111. For the liquid potting compound 5 to smoothly flow into the potting space GS from the potting funnel 4, the fully assembled fan structure is turned upside down by 180 degrees for the potting opening 111 on the base 11 to face upward. And, the liquid potting compound 5 naturally flows into the potting space GS under the force of gravity.

(4) Removing the potting funnel and heating the potted portions of the fan structure to harden the potting compound, and the potting process is completed when the liquid potting compound is cured. More specifically, the potting funnel 4 is removed when the fan potting process is done, and the potted fan structure is heated in an oven to speed up the curing of the potting compound 5.

After the step (3) of aligning an end of the potting funnel with the potting opening and filling a liquid potting compound into the potting space, a further step is conducted to provide a vacuum device to evacuate gas from the potting compound.

Since the potting compound 5 used in the potting process is a fluid having relatively low fluidity, air tends to enter into the potting compound 5 easily or could not successfully escape from the potting space GS during the potting process. Potting compound 5 containing air would form air pores in subsequent heating and curing process to result in poor product quality. Therefore, it is desirable to evacuate air from the potting compound 5 by using a vacuum device, such as a vacuum pump, to create a negative pressure space.

In the present invention, the motor stator enclosure 2 is used as a container to hold the potting compound 5. The potting compound 5 is filled and cured in the potting space GS to fully cover the motor stator 3 and adhere to the motor stator enclosure 2. The cured potting compound 5 enables the motor stator enclosure 2 to firmly connect to the base 11 of the fan frame 1. Further, by using the motor stator enclosure 2 as an exterior part, it is able to precisely observe whether the potted fan structure is defect-free at the stage of assembling of the motor stator enclosure 2 to the motor stator 3. Thus, the problem of using the conventional fan potting process that it is unable to determine whether the stator is fully covered by the potting compound until the mould is removed. The fan potting process according to the present invention also avoids the production-related and quality-related problems possibly occur at the time of removing the mould. For example, mould removing would consume a lot of time and cause damage to the cured potting compound. Further, the fan potting process according to the present invention also saves the additional step of assembling the stator to the fan frame.

In brief, the present invention has the following advantages: (1) low production cost; (2) high production efficiency; (3) high production yield rate; and (4) saving additional step for assembling.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan structure, comprising:
   a fan frame having a base and a shaft barrel vertically upward extended from the base;
   a motor stator enclosure having a top and a bottom; the top being provided with a shaft hole, and the bottom is an open side for correspondingly covering and connecting to a top of the base; the motor stator enclosure, the shaft barrel, and the base together defining a potting space among them;
   a potting opening being selectively formed on one of the base and the top of the motor stator enclosure to communicate with the potting space;
   a motor stator being externally fitted around the shaft barrel and located in the potting space; and
   a potting compound completely filling the potting space and completely covering an outer side of the motor stator.

2. The fan structure as claimed in claim 1, wherein the shaft barrel and the shaft hole on the top of the motor stator enclosure are correspondingly assembled to each other.

3. The fan structure as claimed in claim 1, wherein the base is provided with an annular wall and a wiring opening; and the annular wall and the shaft barrel together defining a recess between them.

4. The fan structure as claimed in claim 3, wherein the motor stator includes a plurality of conducting wires, which are extended through the wiring opening.

5. The fan structure as claimed in claim 3, wherein the motor stator enclosure is provided at the bottom with a radially outward extended flange, and the annular wall and the flange being pressed against and connected to each other.

* * * * *